(12) United States Patent
Guo

(10) Patent No.: US 11,290,756 B2
(45) Date of Patent: Mar. 29, 2022

(54) INTERRUPTIBLE VIDEO TRANSCODING

(71) Applicant: Google LLC, Mountain View, CA (US)

(72) Inventor: Yarong Guo, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/255,330

(22) PCT Filed: Sep. 23, 2019

(86) PCT No.: PCT/US2019/052516
§ 371 (c)(1),
(2) Date: Dec. 22, 2020

(87) PCT Pub. No.: WO2021/061098
PCT Pub. Date: Apr. 1, 2021

(65) Prior Publication Data
US 2021/0250626 A1 Aug. 12, 2021

(51) Int. Cl.
H04N 21/2343 (2011.01)
H04N 19/40 (2014.01)
(Continued)

(52) U.S. Cl.
CPC ..... *H04N 21/234309* (2013.01); *H04N 19/40* (2014.11); *H04N 19/59* (2014.11);
(Continued)

(58) Field of Classification Search
CPC .......... H04N 21/234309; H04N 19/59; H04N 21/440218; H04N 21/8547; H04N 21/433; H04N 19/40; H04N 21/231
See application file for complete search history.

(56) References Cited

U.S. PATENT DOCUMENTS 7,595,743 B1 * 9/2009 Winger ................. H04N 19/13
341/107
8,855,189 B1 * 10/2014 Krause ........... H04N 21/234309
375/240

(Continued)

FOREIGN PATENT DOCUMENTS

EP 1 594 319 11/2005
JP 2008027473 A * 2/2008 ....... H04N 21/47214

OTHER PUBLICATIONS

"International Search Report and Written Opinion in International Application No. PCT/US2019/052516, filed Sep. 23, 2019", dated Aug. 11, 2020, 14 pages.

*Primary Examiner* — Robert J Hance
(74) *Attorney, Agent, or Firm* — IP Spring

(57) ABSTRACT

Implementations described herein relate to methods, devices, and computer-readable media to transcode a video. In some implementations, a computer-implemented method includes obtaining a video that includes a plurality of tracks. The method further includes determining whether a partial transcoded file is available that corresponds to the video. The method further includes, if the partial transcoded file is available, obtaining a timestamp associated with the partial transcoded file, transcoding a portion of the video that begins at the timestamp associated with the partial transcoded file, and combining the partial transcoded file and the transcoded portion of the video to generate an output video. The method further includes, if the partial transcoded file is not available, transcoding the video from a start of the video using the transcoder to obtain a plurality of output tracks and combining the plurality of output tracks to obtain the output video.

20 Claims, 4 Drawing Sheets

(51) Int. Cl.
  *H04N 19/59* (2014.01)
  *H04N 21/231* (2011.01)
  *H04N 21/433* (2011.01)
  *H04N 21/4402* (2011.01)
  *H04N 21/8547* (2011.01)

(52) U.S. Cl.
  CPC ......... *H04N 21/231* (2013.01); *H04N 21/433* (2013.01); *H04N 21/440218* (2013.01); *H04N 21/8547* (2013.01)

(56) References Cited

U.S. PATENT DOCUMENTS

| | | | |
|---|---|---|---|
| 9,691,430 B2* | 6/2017 | Zizys | H04L 65/80 |
| 2005/0246451 A1* | 11/2005 | Silverman | H04L 65/602 |
| | | | 709/231 |
| 2006/0098952 A1* | 5/2006 | Fujimoto | H04N 19/40 |
| | | | 386/224 |
| 2014/0321835 A1* | 10/2014 | Straub | H04N 9/8205 |
| | | | 386/356 |
| 2014/0337903 A1 | 11/2014 | Macinnis | |
| 2015/0143444 A1 | 5/2015 | Dong et al. | |

\* cited by examiner

INTERRUPTIBLE VIDEO TRANSCODING

RELATED APPLICATIONS

This application is a § 371 national stage of PCT International Application No. PCT/US2019/052516, filed Sep. 23, 2019, entitled, "Interruptible Video Transcoding," and which is incorporated by reference herein in its entirety.

BACKGROUND

Users capture videos using various devices such as smartphones, tablets, computers, wearable devices, cameras, etc. Video files can be large in size, e.g., several megabytes or gigabytes, based on the length of video, type of encoding used for the video, resolution and/or bitrate of the video, etc. The captured videos can be stored locally on the device or on a server, e.g., in an image or video library of a user. For example, users may store videos on a server for backup, to share videos with other users, etc. Users may directly share videos with other users, e.g., via a messaging or social networking service.

Storing large video files requires a large amount of storage space. Transmitting large video files to a server requires substantial network resources, e.g., bandwidth. Video transcoding or compression can allow for a video to be reencoded with lower resolution lower bitrate, etc. such that the storage space required to store the video and the network resources used to transmit the video to a server or to a user device of another user are lower than the original video.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to transcode a video.

In some implementations, a computer-implemented method includes obtaining a video that includes a plurality of tracks. The method can further include determining whether a partial transcoded file is available that corresponds to the video. In response to determining that the partial transcoded file is available, the method can further include obtaining a timestamp associated with the partial transcoded file, transcoding a portion of the video with a transcoder, wherein the portion of the video begins at the timestamp associated with the partial transcoded file, and combining the partial transcoded file and the transcoded portion of the video to generate an output video.

In response to determining that the partial transcoded file is not available, the method can further include transcoding the video using the transcoder to obtain a plurality of output tracks, wherein the transcoding is performed from a start of the video, and combining the plurality of output tracks to obtain the output video. In some implementations, the output video may have a lower resolution than a resolution of the video or a lower bitrate than a bitrate of the video.

In some implementations, the method can further include receiving an interrupt during transcoding of the video by the transcoder and in response to the interrupt, saving output of the transcoder as the partial transcoded file. In some implementations, the output of the transcoder can include a plurality of partial output tracks, each partial output track corresponding to a particular track of the plurality of tracks of the video. In these implementations, the method can further include, in response to the interrupt, saving configuration settings associated with the partial transcoded file. In some implementations, the configuration settings can include a format of each of the plurality of partial output tracks. In some implementations, the configuration settings can include a bitrate parameter, a width parameter, or a height parameter.

In some implementations, determining whether the partial transcoded file is available can include accessing a storage device to determine if the partial transcoded file is stored on the storage device. If the partial transcoded file is not stored on the storage device, it is determined that the partial transcoded file is not available. If the partial transcoded file is stored on the storage device, the method can include determining if current configuration settings of the transcoder match the configuration settings associated with the partial transcoded file. If the current configuration settings match, the method can include determining that the partial transcoded file is available. If the current configuration settings do not match, the method can include determining that the partial transcoded file is not available. In some implementations, the method can include deleting the partial transcoded file from the storage device.

In some implementations, the method can further include receiving an interrupt during transcoding of the portion of the video by the transcoder and in response to the interrupt, updating the partial transcoded file to include partial output of the transcoder.

In some implementations, transcoding the video can include decoding one or more of the plurality of tracks of the video to obtain corresponding raw data and encoding the raw data for the decoded one or more of the plurality of tracks to obtain a corresponding output track of the plurality of output tracks. In some implementations, the plurality of tracks may include at least one audio track and at least one video track. In some implementations, the plurality of tracks may further include a metadata track.

In some implementations, the at least one video track can include a plurality of key frames and a plurality of non-key frames. Each key frame and each non-key frame may be associated with a corresponding timestamp. In some implementations, the timestamp associated partial transcoded file may correspond to a particular key frame of the plurality of key frames.

In some implementations, the timestamp associated with the partial transcoded file may include a plurality of time values. Each time value may correspond to a respective track of the plurality of tracks. In these implementations, transcoding the portion of the video can include decoding each of the plurality of tracks beginning at the respective time value of the plurality of time values to obtain corresponding raw data and encoding the raw data for the decoded one or more of the plurality of tracks to obtain a corresponding output track of the plurality of output tracks.

Some implementations include a computing device includes a processor and a memory coupled to the processor, with instructions stored thereon. The instructions, when executed by the processor, cause the processor to perform operations comprising obtaining a video that includes a plurality of tracks and determining whether a partial transcoded file is available that corresponds to the video.

In response to determining that the partial transcoded file is available, the processor may perform operations that include obtaining a timestamp associated with the partial transcoded file, transcoding a portion of the video with a transcoder, and combining the partial transcoded file and the transcoded portion of the video to generate an output video. The portion of the video may begin at the timestamp associated with the partial transcoded file.

In response to determining that the partial transcoded file is not available, the processor may perform operations that include transcoding the video using the transcoder to obtain a plurality of output tracks and combining the plurality of output tracks to obtain the output video. The transcoding may be performed from a start of the video;

In some implementations, the memory can have further instructions stored thereon that cause the processor to perform further operations that include receiving an interrupt during transcoding of the video by the transcoder and in response to the interrupt, saving output of the transcoder as the partial transcoded file.

The output of the transcoder may include a plurality of partial output tracks. Each partial output track may correspond to a particular track of the plurality of tracks of the video. In some implementations, the operations can further include, in response to the interrupt, saving configuration settings associated with the partial transcoded file. In some implementations, the configuration settings may include a format of each of the plurality of partial output tracks. In some implementations, the configuration settings may include one or more of: a bitrate parameter, a width parameter, or a height parameter.

In some implementations, the memory can have further instructions stored thereon that cause the processor to perform further operations that include receiving an interrupt during transcoding of the portion of the video by the transcoder and in response to the interrupt, updating the partial transcoded file to include partial output of the transcoder.

Some implementations include a non-transitory computer-readable medium with instructions stored thereon that, when executed by a processor, cause the processor to perform operations that include obtaining a video that includes a plurality of tracks and determining whether a partial transcoded file is available that corresponds to the video.

In response to determining that the partial transcoded file is available, the operations can further include obtaining a timestamp associated with the partial transcoded file, transcoding a portion of the video with a transcoder, and combining the partial transcoded file and the transcoded portion of the video to generate an output video. The portion of the video may begin at the timestamp associated with the partial transcoded file.

In response to determining that the partial transcoded file is not available, the operations can further include transcoding the video using the transcoder to obtain a plurality of output tracks, wherein the transcoding is performed from a start of the video, and combining the plurality of output tracks to obtain the output video.

In some implementations, the non-transitory computer-readable medium can include further instructions stored thereon that cause the processor to perform further operations that can include receiving an interrupt during transcoding of the video by the transcoder and in response to the interrupt, saving output of the transcoder as the partial transcoded file.

In some implementations, the timestamp associated with the partial transcoded file can include a plurality of time values. Each time value may correspond to a respective track of the plurality of tracks. In these implementations, the operation of transcoding the portion of the video can include decoding each of the plurality of tracks beginning at the respective time value of the plurality of time values to obtain corresponding raw data and encoding the raw data for the decoded one or more of the plurality of tracks to obtain a corresponding output track of the plurality of output tracks.

In some implementations, a computer-implemented method includes obtaining a video that includes a plurality of tracks. The method further includes obtaining a partial transcoded file that corresponds to the video wherein a timestamp is associated with the partial transcoded file. The method further includes transcoding a portion of the video with a transcoder, wherein the portion of the video begins at the timestamp associated with the partial transcoded file. The method further includes combining the partial transcoded file and the transcoded portion of the video to generate an output video. In some implementations, the output video has at least one of a lower resolution than a resolution of the video or a lower bitrate than a bitrate of the video.

In some implementations, the method can further include receiving an interrupt during transcoding of the portion of the video by the transcoder and in response to the interrupt, updating the partial transcoded file to include partial output of the transcoder.

In some implementations, the partial output of the transcoder includes a plurality of partial output tracks. In some implementations, each partial output track corresponds to a respective track of the plurality of tracks of the video. In some implementations, the method can further include saving configuration settings associated with the partial transcoded file, in response to the interrupt. In some implementations, the configuration settings include one or more of a format of each of the plurality of partial output tracks, or one or more of: a bitrate parameter, a width parameter, or a height parameter.

In some implementations, the plurality of tracks includes at least one video track that includes a plurality of key frames and a plurality of non-key frames. In some implementations, each key frame and each non-key frame is associated with a corresponding timestamp. In some implementations, the timestamp associated with the partial transcoded file corresponds to a particular key frame of the plurality of key frames.

In some implementations, the timestamp includes a plurality of time values. In some implementations, each time value of the plurality of time values corresponds to a respective track of the plurality of tracks. In some implementations, transcoding the portion of the video can include decoding each of the plurality of tracks beginning at the respective time value of the plurality of time values to obtain corresponding raw data and encoding the raw data for the decoded one or more of the plurality of tracks to obtain a corresponding output track of the plurality of output tracks.

DETAILED DESCRIPTION

Video transcoding or compression is a resource intensive and slow process. Transcoding a video may be a computationally expensive operation, e.g., in terms of processing capacity used, memory used, and energy used for transcoding. For example, compressing a high quality video such as 4K video or high definition (HD) video on a client device such as a smartphone or tablet may take a significant amount of time, e.g., equal to the length of the video, twice the length of the video, or longer, depending on the configuration of the device that performs the compression. Further, because compression is a computationally expensive operation, it is often infeasible to perform compression while a user is actively using a client device, since such operation may affect the availability and/or responsiveness of the client device for user tasks.

One technique of avoiding such a situation is to perform video compression during a time when the user is not actively using the client device, e.g., when the client device is idle. However, if the compression is interrupted, e.g., due to a user action, due to an operating system interrupt, etc., the compression needs to be restarted, wasting computational resources.

Further, the time necessary to compress videos increases with the length of the video, thereby also increasing the likelihood of an interruption during the compression process for such videos. For example, if a proportion of compression operations are interrupted, e.g., 10%, such compression needs to be restarted from scratch. Further, on battery constrained devices such as smartphones, tablets, laptops, etc., such wasted computation is also wasteful of energy where a limited amount is available on-device.

Implementations described herein were conceived in light of some of these problems. Per implementations described herein, video transcoding techniques are described that enable the video transcoding operation to be resumed from a point at which the transcoding operation is interrupted. A partial transcoded file is saved at the time of the interrupt and is used during a subsequent transcoding operation, thus eliminating or reducing wastage of computational resources and energy. The described implementations can process any type of video, including videos with a single track, videos with multiple tracks, etc.

Figure 1:
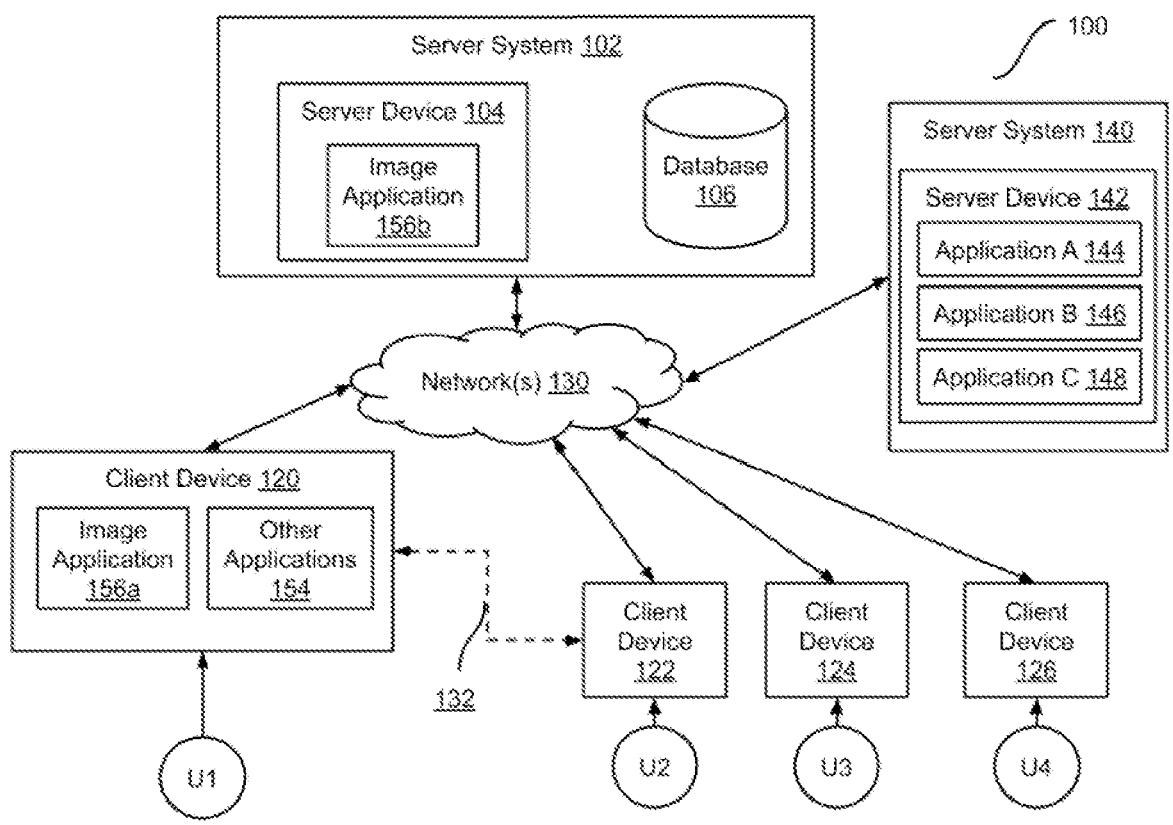
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 and second server system 140 in the example of FIG. 1. Server systems 102 and 140 can communicate with a network 130, for example. Server system 102 can include a server device 104 and a database 106 or other storage device. In some implementations, server device 104 may provide image application 156b. Second server system 140 can include a second server device 142, configured to provide one or more applications, e.g., application A 144, application B 146, and application C 148. In FIG. 1 and the remaining figures, a letter after a reference number, e.g., "156a," represents a reference to the element having that particular reference number. A reference number in the text without a following letter, e.g., "156," represents a general reference to embodiments of the element bearing that reference number.

Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, second server system 140, and second server device 142, and shows four blocks for client devices 120, 122, 124, and 126. Server blocks 102, 104, 106, 140, and 142 may represent multiple systems, server devices, and network databases, and the blocks can be provided in different configurations than shown. For example, server system 102 and/or second server system 140 can represent multiple server systems that can communicate with other server systems via the network 130. In some implementations, server system 102 and/or second server system 140 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 or second server system 140, and/or via a network service, e.g., a social network service or other type of network service, implemented on server system 102 or second server system 140. For example, respective client devices 120, 122, 124, and 126 may communicate data to and from one or more server systems (e.g., system 102, second server system 140).

In some implementations, the server system 102 and/or second server system 140 may provide appropriate data to the client devices such that each client device can receive communicated content or shared content uploaded to the server system 102 or second server system 140 and/or network service. In some examples, users U1-U4 can interact via audio or video conferencing, audio, video, or text chat, or other communication modes or applications.

A network service implemented by server system 102 or second server system 140 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide image application 156a and one or more other applications 154. Client devices 122-126 may also provide similar applications. Image application 156a may be implemented using hardware and/or software of client device 120. In different implementations, image application 156a may be a standalone client application, e.g., executed on any of client devices 120-124, or may work in conjunction with image application 156b provided on server system 102. Image application 156a and image application 156b may provide various functions related to images and/or videos. For example, such functions may include one or more of capturing images or videos using a camera, analyzing images or videos to associate one or more tags, modifying images or videos, storing images or videos in a library or database, etc.

In some implementations, image application 156 may enable a user to manage the library or database that stores images and/or videos. For example, a user may use a backup functionality of image application 156a on a client device (e.g., any of client devices 120-126) to back up local images or videos on the client device to a server device, e.g., server device 104. For example, the user may manually select one or more images or videos to be backed up, or specify backup settings that identify images or videos to be backed up. Backing up an image or video to a server device may include transmitting the image or video to the server for storage by the server, e.g., in coordination with image application 156b on server device 104.

In some implementations, a video may be compressed to reduce a file size of the video prior to transmitting the video to a server for backup. For example, such compression may include transcoding the video to reduce one or more of a bitrate of the video, a resolution of the video, or a frame rate of the video. Transcoding may also include changing a file format of the video. Reducing the file size of the video reduces the amount of network used to transmit the video from a client device to a server. Further, a smaller file size reduces the amount of storage space required to store the video at a server, compared to storing the video in the original format. In some implementations, image application 156 may implement video transcoding that supports pausing the transcoding operation, e.g., in response to an interrupt being received, and resuming the transcoding operation at a later time.

In some implementations, client device 120 may include one or more other applications 154. For example, other applications 154 may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of other applications 154 may be standalone applications that execute on client device 120. In some implementations, one or more of other applications 154 may access a server system, e.g., server system 102 and/or second server system 140, that provides data and/or functionality of other applications 154. For example, any of applications 144, 146, and 148, shown as being provided by second server system 140 may provide data and/or commands to one or more of other applications 154. In some implementations, server applications 144-148 may be standalone applications that are accessed by a client device, e.g., via a web-browser, or other client-side program.

A user interface on a client device 120, 122, 124, and/or 126 can enable the display of user content and other content, including images, video, data, and other content as well as communications, privacy settings, notifications, and other data. Such a user interface can be displayed using software on the client device, software on the server device, and/or a combination of client software and server software executing on server device 104 and/or second server device 142, e.g., application software or client software in communication with server system 102 and/or second server device 142. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemagraphs where a portion of the image includes motion while other portions are static, etc.), or a video (e.g., a sequence of images or image frames that may include audio). While the remainder of this document refers to an image as a static image, it may be understood that the techniques described herein are applicable for dynamic images, video, etc. For example, implementations described herein can be used with still images (e.g., a photograph, or other image), videos, or dynamic images.

Figure 2:
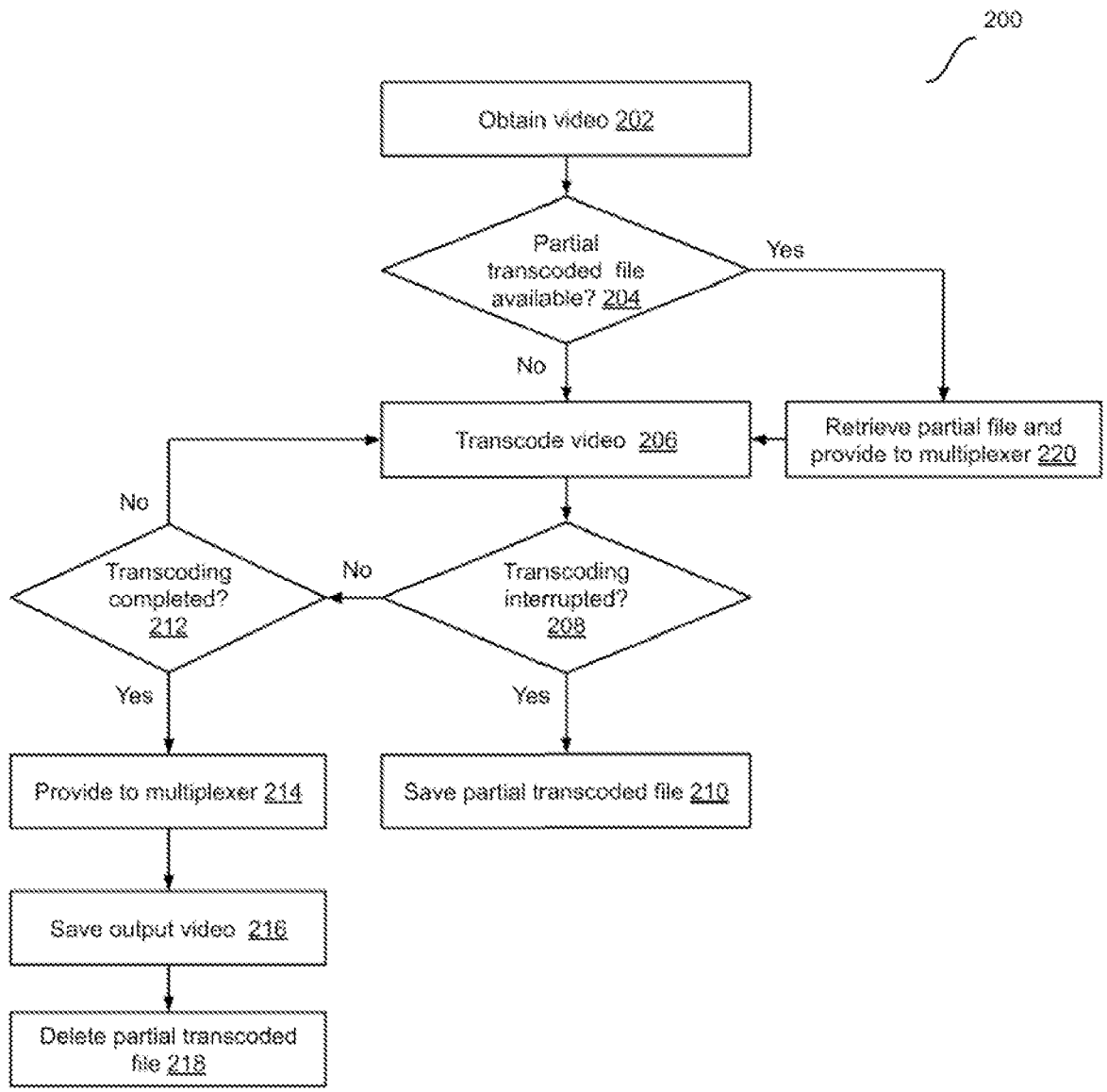
FIG. 2 is a block diagram illustrating an example method to transcode a video, according to some implementations.

FIG. 2 is a flow diagram illustrating an example method 200 to transcode a video, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., a client device entering an idle state, a threshold number of videos that are not backed up, a new video being captured or stored on a client device, a predetermined time period having expired since the last performance of method 200, and/or one or more other conditions occurring which can be specified in settings read by the method.

Method 200 may begin at block 202. At block 202, a video is obtained. For example, the video may be a video captured or otherwise obtained by any of client devices 120-126. In some implementations, the video may include a plurality of tracks. For example, the plurality of tracks may include one or more audio tracks and/or one or more video tracks. The one or more audio tracks may include, e.g., a single audio track (mono sound), two audio tracks (stereo sound), more than two audio tracks (e.g., for surround sound, one track for each language, etc.), or any other number of audio tracks. The one or more video tracks may include, e.g., a single video track, two video tracks (e.g., for a three-dimensional video), etc. In some implementations, the video may also include one or more metadata tracks. For example, the metadata track may include text captions in one or more languages, information about the video, e.g., location of capture, time of capture, MIME format, etc.

A video track may include a plurality of frames, including a plurality of key frames and a plurality of non-key frames. Each video frame may be associated with a corresponding timestamp. The plurality of frames may be arranged in a sequence, based on respective timestamps. In some implementations, key frames may include intra-coded frames (I-frames) that do not require other video frames to decode. In some implementations, non-key frames may include predicted frames (P-frames). Decoding P-frames may require data from one or more prior frames. In some implementations, non-key frames may include bidirectional predicted frames (B-frames). Decoding B-frames may require data from one or more prior frames and one or more subsequent frames. Decoding of frames may be performed based on associated timestamps.

In some implementations, the video may be a high quality video that is uncompressed or compressed using lossless compression. A high quality video may have a high bitrate and high resolution. For example, a high quality video captured using a smartphone or other device may be a 4K video, e.g., having a horizontal pixel resolution of 4096 pixels; a high definition (HD) video, e.g., having a horizontal pixel resolution of 1080 pixels, etc. Bitrate may correspond to color information of the video, e.g., 24-bit color, 16-bit color, etc. The high quality video may require a large amount of storage space, e.g., a single minute of 4K video may require several hundred megabytes of storage (e.g., 300 MB or more), a single minute of high definition video may require over a hundred megabytes of storage. Further, transmitting the high quality video over a network, e.g., for storage on a server (e.g., server device 104) may require a significant amount of network resources.

An audio track may include a plurality of audio samples or audio frames. Each audio sample or audio frame may be associated with a corresponding timestamp. In some implementations, frames of an audio track and a video track in the video may be synchronized. For example, each audio frame may correspond to a particular frame of the video, e.g., a particular key frame (or other frame) such that both are associated with the same timestamp. In some implementations, the audio track and the video track may be mutually independent, such that timestamps associated with video frames may be different from timestamps associated with audio frames. For example, if the video track in a video has a frame rate of 30 frames per second (fps), there may be 30 timestamps per second, whereas the audio track of the same video may have fewer (e.g., 1, 2, 5, etc.) timestamps per second.

In some implementations, a metadata track may also be associated with timestamps. For example, captions or text metadata may be associated with timestamps. The timestamps associated with the metadata track may be synchronized with those of a video track, or may be independent.

In some implementations, transcoding a video may include, e.g., converting the video to a different bitrate and/or resolution. In some implementations, transcoding may include changing a frame rate of the video. For example, when method 200 is implemented on a client device, e.g., to compress videos to use lower amount of storage space, to compress videos prior to backing up videos to a server, transcoding may include one or more of reducing the bitrate, reducing a resolution of the video, reducing the frame rate of the video, etc. such that the output video obtained after transcoding has a lower file size than the video. In different implementations, transcoding parameters may be selected to target a particular compression ratio (e.g., 4:1), a particular target resolution (e.g., changing a 4K video to HD video, etc.), etc. In some implementations, transcoding may change a filetype of the video, e.g., convert the video to a different filetype than the original filetype in which the video is stored.

In some examples, transcoding a video may include only format conversion, without substantially changing a quality of the video. For example, such transcoding may be performed to convert the video to a standard format for which playback is supported on a variety of devices, to convert the video to a format that is suitable for streaming over a network, etc. In some examples, transcoding may include increasing a resolution of the video, e.g., by upsampling, or otherwise converting the video to a higher quality. In some implementations, transcoding may include adjusting other properties of the video, e.g., converting a video of 16:9 aspect ratio to a 4:3 or square aspect ratio, rotating the video, etc.

In some implementations, transcoding may include converting an audio track of the video to a different format, merging or selecting from multiple audio tracks into a smaller number of tracks, e.g., merging stereo audio track to a obtain a mono audio track, etc. In some implementations, transcoding the audio track may include converting the audio track to a different format.

In some implementations, a plurality of videos, e.g., high quality videos, may be obtained for transcoding. When a plurality of videos are obtained, the videos may be sorted prior to transcoding. For example, the videos may be sorted such that videos for which partial transcoded files are available are processed before videos for which partial transcoded files are not available. For example, partial transcoded files may be stored on a local storage device of a device that implements method 200.

In some implementations, the videos may be sorted based on creation time, last modified time, or other parameters associated with the video. In some implementations, e.g., when the output video of method 200 is sent from a client device to a server device for backup, the videos may be obtained from a backup queue and may have the same sort order as that of the backup queue. In some implementations, videos may be sorted based on filesize of the video, based on user selection, etc. For example, if a user selects a particular video for backup, the video may be placed first in the sorted order. In different implementations, various combinations of filesize, availability of partial transcoded files, creation time, last modified time, user selection, etc. may be used to sort the plurality of videos.

In some implementations, videos may be sorted based on a score assigned to the video. For example, the score may be assigned by a trained machine learning model. For example, the score may indicate an importance of the video. The machine learning model may determine the score of the video based on analysis of the video and/or video metadata. If the user permits, the analysis of the video can include determining whether one or more persons or objects are depicted in the video, types of objects, the nature of motion of the persons or objects in the video, locations depicted in the video, whether the video is stable or has shaking, etc.

In some implementations, method 200 may be performed multiple times, e.g., once for each video, selected from the sorted plurality of videos. Block 202 may be followed by block 204.

At block 204, it is determined whether a partial transcoded file that corresponds to the video is available. For example, a storage device (e.g., a local storage device of a computing device that implements method 200) may be accessed to determine if the partial transcoded file is stored on the storage device. If the partial transcoded file is not stored on the storage device, it is determined that the partial transcoded file is not available.

If the partial transcoded file is stored on the storage device, the configuration settings associated with the partial transcoded file may be determined. For example, the configuration settings may be stored as metadata within the partial transcoded file, as a separate configuration file, or in a database. For example, the configuration settings may include a format of one or more tracks in the partial transcoded file, e.g., the MIME (Multipurpose Internet Mail Extensions) format. The format may be a standard format such as, e.g., Advanced Video Coding (AVC) format, high efficiency video coding (HEVC) format, etc. In another example, the configuration settings may include a bitrate parameter, a width parameter, or a height parameter used as configuration of the transcoder at a time the partial transcoded file was generated by the transcoder. In some implementations, the configuration settings may include a bitrate mode parameter.

The configuration settings associated with the partial transcoded file may be compared with current configuration settings of a transcoder that is to be used to transcode the video to determine if the configuration settings match. If the configuration settings match, it is determined that the partial transcoded file is available.

If the configuration settings do not match, it is determined that the partial transcoded file is not available. In this case, even though the partial transcoded file exists, the partial transcoded file is identified as encoded with different transcoder settings such that it cannot be combined with further output from the transcoder, and therefore, the partial transcoded file may not be usable to generate an output video. In some implementations, if the configuration settings do not match, the partial transcoded file may be deleted from the storage. device. If a configuration file associated with the partial transcoded file is stored separately, such configuration file may also be deleted.

If it is determined that the partial transcoded file is available, block 204 may be followed by block 220. If it is determined that the partial transcoded file is not available, block 204 may be followed by block 206.

In block 220, the partial transcoded file is retrieved and provided to a multiplexer. For example, the partial transcoded file may include a plurality of transcoded tracks, each corresponding to a respective track of the plurality of tracks of the video. The multiplexer may combine the plurality of transcoded tracks into a single output file. For example, the output file may be a MPEG-4 video file.

In some implementations, a timestamp may be associated with the partial transcoded file and may be retrieved. The timestamp may correspond to a last frame, e.g., a particular key frame, of a video track of the video that is included in the partial transcoded file. For example, when the partial transcoded file includes data corresponding to a start of the video (e.g., at time 0 seconds) to an intermediate point (e.g., at time t seconds), the timestamp may indicate the intermediate point t. In some implementations, a single timestamp may be associated with the partial transcoded file.

In some implementations, the timestamp may include a plurality of time values. For example, each of the plurality of time values may correspond to a respective track of the plurality of tracks. In some implementations, one or more tracks, e.g., a metadata track, may not be associated with timestamps, e.g., if the data of the tracks is not data used for sequential playback of the video. In these implementations, the plurality of time values may be retrieved. Block 220 may be followed by block 206.

In block 206, the video is transcoded. In some implementations, transcoding may be performed in two stages—a decoder stage followed by an encoder stage. In the decoder stage, the video may be decoded, e.g., converted from the stored format to a format that is suitable for the encoder stage. For example, if the video is encoded using a particular codec, the decoder stage may decode the video to a raw or uncompressed data stream. In some implementations, decoding may include decompressing the video. In some implementations, the decoder stage may include a plurality of decoders. For example, a video decoder may be used to decode one or more video tracks of the video and an audio decoded may be used to decode one or more audio tracks of the video. In some implementations, audio tracks of the video may not be decoded, e.g., if the target audio format is the same as that of the audio tracks in the video, or if the audio tracks are in a format that is supported by the multiplexer. The output of the decoder stage may be provided to the encoder stage.

In the encoder stage, the raw or uncompressed data stream of the video may be encoded to a target format of the encoder, e.g., as specified in configuration settings of the encoder. in some implementations, encoding may include compressing the video. Compression may include one or more lowering a bitrate of the video, lowering a resolution of the video, lowering a frame rate of the video, etc. In some implementations, encoding the audio portion of the video may include encoding the audio to the target audio format without a change (or minimal change) in the quality.

Transcoding the video may be performed for the entire video or for a portion of the video, based on whether the partial transcoded file is available. For example, if the partial transcoded file is not available, the video may be transcoded from a start of the video, e.g., from 0 seconds to the end of the video.

If the partial transcoded file is available, a portion of the video may be transcoded. For example, the portion of the video that is transcoded may begin at the timestamp associated with the partial transcoded file. Selectively transcoding the portion of the video that was not previously transcoded and stored in the partial transcoded file reduces the computational load of transcoding, e.g., since only the portion of the video is required to be loaded into memory for decoding and subsequent encoding to the target format.

In some implementations, when the timestamp includes a plurality of time values each corresponding to a respective track of the plurality of tracks in the video, transcoding may be performed separately for each track. In these implementations, each of the plurality of tracks may be decoded beginning at the respective time value of the plurality of time values to obtain corresponding raw data. The raw data may then be encoded to obtain a corresponding output track. Block 206 may be followed by block 208.

In block 208, it may be determined whether an interrupt was received during transcoding. For example, when method 200 is implemented on a client device, an interrupt may be received when a user of the client device activates the client device, e.g., unlocks a smartphone, provides voice or touch input, or otherwise accesses the client device. An interrupt may also be received as a system event, e.g., when the client device wakes up to access the network, to display a notification, etc. If an interrupt is received, block 208 may be followed by block 210. If no interrupt is received, block 208 may be followed by block 212.

In block 210, a partial transcoded file is saved. For example, if an interrupt is received before the end of the video is reached during transcoding, the portion of the video for which transcoding was completed may be stored as the partial transcoded file. In some implementations, a filename and storage location for the partial transcoded file may be selected using a predetermined scheme. For example, the filename may be selected to include the filename of a video file of the video (e.g., "video1.extension"), appended with a phrase (e.g., "partial") that indicates that the file is a partial transcoded file that correspond to the video, e.g., "video1_partial"). When multiple partial transcoded files are stored for a video, a sequence number may be used, e.g., "video1_partial_1," "video1_partial_2," and so on. The filename and storage location can be utilized to determine whether the partial transcoded file is available, e.g., as described above with reference to block 204. In some implementations, a database may store the filename of the video and the filename of the corresponding partial transcoded file.

The output of the transcoder at the time an interrupt is received may include a plurality of partial output tracks. Each partial output track may correspond to a particular track of the video. For example, the partial transcoded file may be a video file in a standard format, e.g., the target format of the transcoding such as MP4 format. In some implementations, if multiple interrupts are received during transcoding of a video, multiple partial transcoded files may be saved, e.g., each partial transcoded file corresponding to a particular portion of the video that was transcoded between a prior interrupt (or start of the video) and a current interrupt. In these implementations, each partial transcoded file may have a respective associated timestamp and may be processed in sequence when the video is processed next, e.g., beginning at block 202.

In some implementations, the partial transcoded file obtained after a first interrupt (e.g., that includes data for time 0 to t1) may be updated to add the partial output of the transcoding, e.g., subsequent transcoded portion of the video up to a next interrupt (e.g., from time t1 to t2, where 0<t1<t2) with a corresponding timestamp (t2). In the implementations, when the video is processed next, e.g., beginning at block 202, the transcoding can begin at the timestamp t2. In some implementations, the timestamp may be stored as metadata in the partial transcoded file, in a separate file, or in a database. The partial transcoded file stored at block 210 may be processed at a subsequent iteration of method 200, e.g., at a next performance of block 202.

If it is determined at block 208 that the transcoding is not interrupted, block 208 may be followed by block 212. At block 212, it is determined whether the transcoding is completed, e.g., whether the end of the video was reached. If the transcoding is not completed, block 212 is followed by block 206 to continue encoding the video. If the transcoding is completed, block 212 is followed by block 214.

In block 214, the transcoded output data is provided to the multiplexer and an output video is obtained from the multiplexer. The multiplexer may combine the plurality of transcoded tracks into a single output file. Further, when transcoding is performed for a portion of the video (e.g., the portion starting at the timestamp associated with the partial transcoded file), the multiplexer combines the transcoded output data with the partial transcoded file. The output of the multiplexer is an output video file in the target video format. For example, the output file may be a MPEG-4 video file. Block 214 may be followed by block 216.

In block 216, the output video is saved, e.g., to a storage device of the device that implements method 200. For example, if method 200 is implemented on a client device 120-126, the output video is saved to a local storage device of the client device. In some implementations, the output video may have a lower resolution than a resolution of the video and/or a lower bitrate than a bitrate of the video. Block 216 may be followed by block 218.

In block 218, the partial transcoded file may be deleted. Since the partial transcoded file is used to resume transcoding after an interruption, once the output video is obtained, the partial transcoded file may be deleted from the storage device to reclaim storage space. If a configuration file associated with the partial transcoded file is stored separately, such configuration file may also be deleted.

Various blocks of method 200 may be combined, split into multiple blocks, or be performed in parallel. For example, blocks 204-220 may be performed in parallel, such that multiple videos are processed simultaneously to obtain corresponding output videos. In another example, block 220 may be performed in parallel with block 206 such that while the multiplexer processes the partial transcoded file, additional transcoded video is obtained in parallel. Further, the plurality of tracks of a video may be processed in parallel in block 206.

In some implementations, one or more blocks of method 200 may be performed on a central processing unit (CPU) or a graphics processing unit (GPU) or accelerator of a device that implements method 200. For example, block 206 may be performed on a GPU or accelerator that may be suitable for video decoding and encoding, while other blocks method 200 may be performed on a CPU.

While the foregoing discussion refers to output videos that are smaller in size than input videos, it will be understood that method 200 can be performed to transcode video for other purposes, e.g., to perform format conversion without compression, to retarget the video to a different aspect ratio, to upconvert a video from a lower resolution or bitrate to a higher resolution or bitrate, to trim a video, to rotate a video, to apply a filter to the video, to add a track to a video, to remove a track from the video, etc.

Method 200, or portions thereof, may be repeated any number of times using additional inputs. For example, method 200 may be repeated until all videos obtained in block 202 are processed to obtain corresponding output videos.

Figure 3:
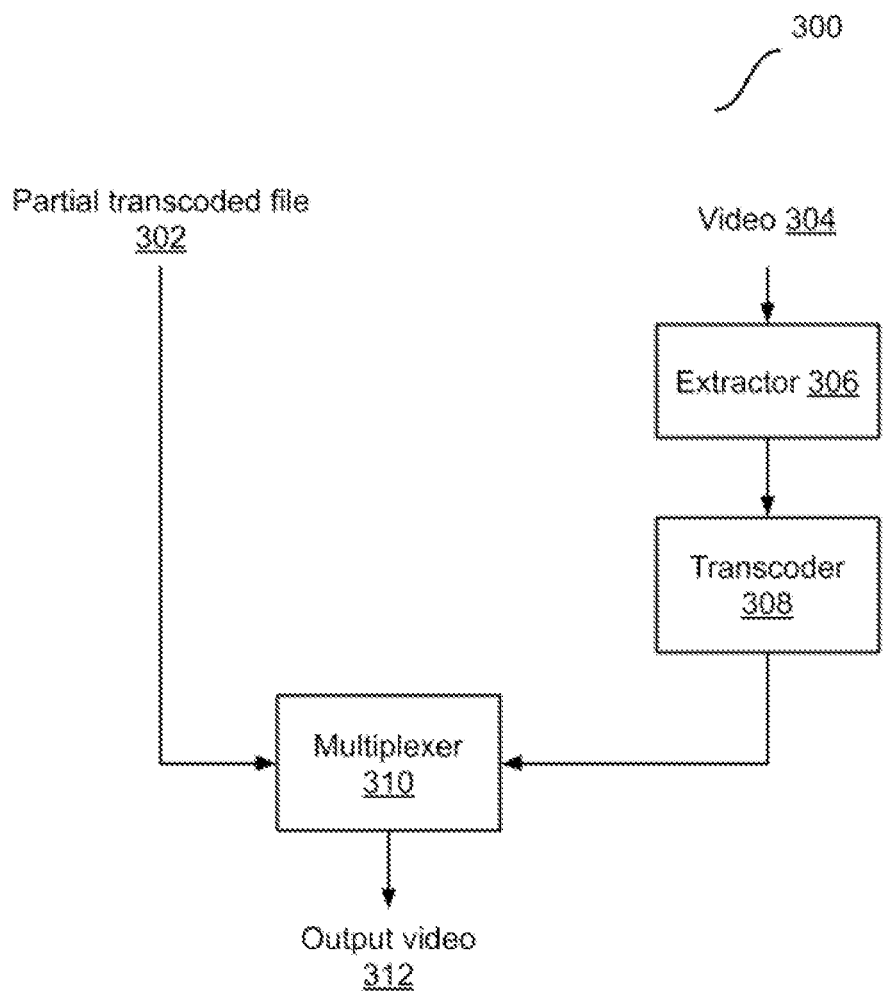
FIG. 3 illustrates an example processing pipeline to transcode a video, according to some implementations.

FIG. 3 illustrates an example processing pipeline 300 to transcode a video, according to some implementations. Processing pipeline 300 may include an extractor 306, a transcoder 308, and a multiplexer 310. In some implementations, the processing to obtain a transcoded may be carried out in two stages when a partial transcoded file is available.

In a first stage, partial transcoded file 302 is provided as input to multiplexer 310. Partial transcoded file 302 may include a plurality of tracks, each track corresponding to a particular track of video 304. For example, partial transcoded file 302 may be obtained as partial output of transcoder 308 when transcoding is interrupted prior to video 304 being processed in entirety. Multiplexer 310 may combine the plurality of tracks from partial transcoded file 302 to obtain output video 312. For example, multiplexer 310 may package the individual encoded tracks obtained from partial transcoded file 302 into a file container, e.g., a MP4 file. Partial transcoded file 302 is provided to multiplexer 310 without performing any transcoding operations. In this stage, output video 312 may include tracks for a start of video 304 up to a timestamp associated with partial transcoded file 302.

In a second stage, video 304 is provided as input to extractor 306. Extractor 306 may extract tracks of video 304 starting from the timestamp associated with partial transcoded file 302. In some implementations, extractor 306 may obtain frames associated with a video track of video 304 starting at a nearest key frame prior to the timestamp, e.g., a key frame that is associated with a timestamp that matches the timestamp associated with partial transcoded file 302, or if the timestamp does not match, an immediately previous key frame. Extractor 306 may continue to extract frames, e.g., in a sequential order, until the end of video 304 is reached. Similarly, extractor 306 may extract frames for other tracks of video 304, e.g., other video tracks, audio tracks, metadata track, etc. Extractor 306 may provide the obtained frames to transcoder 308.

Transcoder 308 may include a decoder stage and an encoder stage. Transcoder 308 may decode the frames provided by extractor 306 and encode the decoded frames to a target format, e.g., as specified in the configuration settings of transcoder 308. Transcoder 308 may generate a plurality of output frames corresponding to each track of video 304. Transcoder 308 may generate output frames for one or more tracks of the video that are provided by extractor 306. Transcoder 308 may provide the output frames for a plurality of tracks of video 304 to multiplexer 310. Multiplexer 310 may combine the plurality of tracks from the transcoder output to obtain output video 312. For example, multiplexer 310 may package the individual encoded tracks obtained from transcoder 308 into a file container, e.g., a MP4 file.

In some implementations, different operations of processing pipeline 300 may be performed in sequence, e.g., the first stage may be completed before the second stage is initiated. For example, in these implementations, multiplexer 310 may first package the individual encoded tracks obtained from partial transcoded file 302 into a file container and then add the individual encoded tracks obtained from transcoder 308 into the file container.

In some implementations, e.g., when transcoder 308 and/or multiplexer 310 has sufficient buffer capacity, the first stage and the second stage may be performed in parallel. For example, multiplexer 310 may process the individual encoded tracks obtained from partial transcoded file 302 at the same time as transcoder 308 performs transcoding, with the output of transcoder 308 being queued or buffered from processing by multiplexer 310. Multiplexer 310 thus processes the video in sequential order of frames. In some implementations, when processing pipeline 300 is interrupted, output video 312 at the time of interruption may replace partial transcoded file 302.

In some implementations, extractor 306 may support extracting tracks of video 304 at corresponding time values (resume points), as indicated by the timestamp associated with partial transcoded file 302. In these implementations, each track is extracted starting from the corresponding time values and is provided to transcoder 308. Further, the time value for each track may be chosen such that the time value corresponds to a key frame for that track, such that frames extracted by extractor 306 can be decoded successfully by transcoder 308. For example, when video 304 includes a video track that includes I-frames, P-frames, and B-frames, the time value for partial transcoded file 302 may correspond to an I-frame In some implementations, extractor 306 may support extracting tracks starting from a single timestamp such that all tracks of video 304 are extracted at the same starting point, e.g., the timestamp associated with partial transcoded file 302. In some cases, the timestamp may not correspond to a key frame for one or more of the tracks. In these implementations, to ensure that the extracted tracks can be decoded by transcoder 308, output video 312 is written in key frame to key frame chunks such that if processing pipeline 300 is interrupted, output video 312 (which is used as partial transcoded file 302 or replaces a previous partial transcoded file 302) ends at a time that corresponds to a key frame across the plurality of tracks. For example, multiplexer 310 may buffer transcoded frames from different tracks till a key frame is reached that is synchronized across the different tracks. In these implementations, if additional frames have been generated by transcoder 308, multiplexer 310 discards such frames. These implementations may also be beneficial in that the partial transcoded file can be stored in any format that supports multiple tracks of the same length.

Processing pipeline 300 utilizes partial transcoded file 302, e.g., generated during an interrupted transcoding operation, in the generation of output video 312. Reuse of the partially transcoded file reduces computational cost, e.g., since frames that were previously transcoded are stored and reused, rather than being discarded upon receipt of an interrupt. Reduction in computational cost in this manner can achieve lower processor usage and lower energy usage. Processing pipeline 300 may enable an improved battery lifetime when processing pipeline 300 is performed on a device that is battery powered. Processing pipeline 300 may also improve the speed of transcoding, since previously processed portions of video 304 do not need to be processed again by extractor 306 and transcoder 308.

Figure 4:
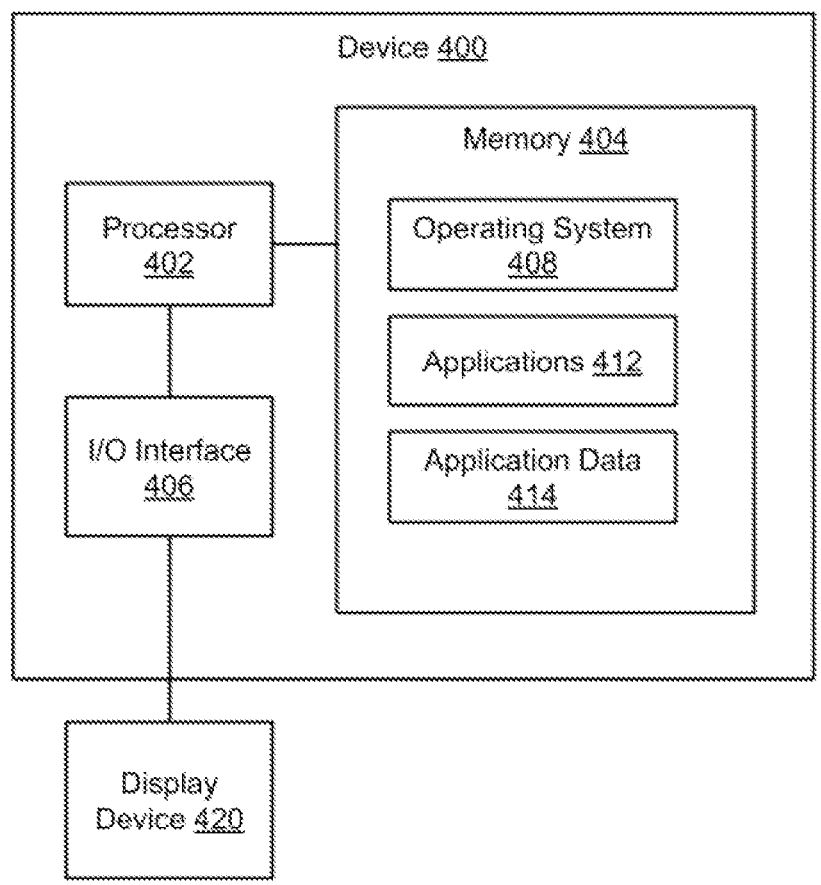
FIG. 4 is a block diagram of an example device which may be used for one or more implementations described herein.

FIG. 4 is a block diagram of an example device 400 which may be used to implement one or more features described herein. In one example, device 400 may be used to implement a client device, e.g., any of client devices 115 shown in FIG. 1. Alternatively, device 400 can implement a server device, e.g., server 101. In some implementations, device 400 may be used to implement a client device, a server device, or both client and server devices. Device 400 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 400 includes a processor 402, a memory 404, and input/output (I/O) interface 406. Processor 402 can be one or more processors and/or processing circuits to execute program code and control basic operations of the device 400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 402 may include one or more co-processors that implement neural-network processing. In some implementations, processor 402 may be a processor that processes data to produce probabilistic output, e.g., the output produced by processor 402 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, applications 412, and application data 414. Applications 412 may include applications such as an image application, a data display engine, web hosting engine, image display engine, notification engine, social networking engine, etc. In some implementations, applications 412 can each include instructions that enable processor 402 to perform functions described herein, e.g., some or all of the methods of FIG. 2.

Other applications 412 can include, e.g., image applications, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 404 can alternatively be stored on any other suitable storage location or computer-readable medium. In addition, memory 404 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. Interfaced devices can be included as part of the device 400 or can be separate and communicate with the device 400. For example, network communication devices, storage devices (e.g., memory and/or database 106), and input/output devices can communicate via I/O interface 406. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 406 can include one or more display devices 420 that can be used to display content, e.g., images, video, and/or a user interface of an output application as described herein. Display device 420 can be connected to device 400 via local connections (e.g., display bus) and/or via networked connections and can be any suitable display device. Display device 420 can include any suitable display device such as an LCD, LED, or plasma display screen, CRT, television, monitor, touchscreen, 3-D display screen, or other visual display device. For example, display device 420 can be a flat display screen provided on a mobile device, multiple display screens provided in a goggles or headset device, or a monitor screen for a computer device.

The I/O interface 406 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 4 shows one block for each of processor 402, memory 404, I/O interface 406, and software blocks 408 and 412. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While some components are described as performing blocks and operations as described in some implementations herein, any suitable component or combination of components of environment 100, device 400, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to transcode a video, the method comprising:
   obtaining the video, wherein the video includes a plurality of tracks;
   determining that a partial transcoded file is available that corresponds to the video based on determining that current configuration settings of the transcoder for the video match configuration settings associated with the partial transcoded file;
   in response to determining that the partial transcoded file is available:
      obtaining a timestamp associated with the partial transcoded file;
      transcoding a portion of the video with a transcoder, wherein the portion of the video begins relative to the timestamp associated with the partial transcoded file; and
      combining the partial transcoded file and the transcoded portion of the video to generate an output video.

2. The computer-implemented method of claim 1, wherein the output video has at least one of: a lower resolution than a resolution of the video or a lower bitrate than a bitrate of the video.

3. The computer-implemented method of claim 1, further comprising:
   transcoding the video by the transcoder from a start of the video;
   receiving a first interrupt during transcoding of the video by the transcoder;
   in response to the first interrupt, saving first output of the transcoder as the partial transcoded file and storing the timestamp associated with the partial transcoded file, the timestamp corresponding to a time of the first interrupt;
   receiving a second interrupt during the transcoding of the portion of the video by the transcoder;
   in response to the second interrupt, saving second output of the transcoder by adding the second output of the transcoder to the partial transcoded file and storing a second timestamp corresponding to a time of the second interrupt;
   obtaining the second timestamp associated with the partial transcoded file;

transcoding a second portion of the video with the transcoder, wherein the second portion of the video begins relative to the second timestamp associated with the partial transcoded file; and wherein combining the partial transcoded file and the transcoded portion of the video includes combining the partial transcoded file and the second portion of the video.

4. The computer-implemented method of claim 3, wherein the output of the transcoder includes a plurality of partial output tracks, each partial output track corresponding to a particular track of the plurality of tracks of the video, the method further comprising, in response to the first interrupt, saving configuration settings associated with the partial transcoded file, wherein the configuration settings include one or more of:

a format of each of the plurality of partial output tracks, or one or more of: a bitrate parameter, a width parameter, or a height parameter.

5. The computer-implemented method of claim 1, further comprising selecting the video for transcoding from a plurality of videos, wherein the plurality of videos are sorted such that videos of the plurality of videos for which partial transcoded files are available are selected for transcoding before videos of the plurality of videos for which partial transcoded files are not available.

6. The computer-implemented method of claim 1, further comprising:

receiving an interrupt during transcoding of the portion of the video by the transcoder; and in response to the interrupt, updating the partial transcoded file to include partial output of the transcoder.

7. The computer-implemented method of claim 1, wherein the plurality of tracks include at least one audio track and at least one video track, wherein the at least one video track includes a plurality of key frames and a plurality of non-key frames, each key frame and each non-key frame associated with a corresponding timestamp.

8. The computer-implemented method of claim 7, further comprising:

determining that the timestamp associated with the partial transcoded file does not correspond to the plurality of key frames of one or more of the plurality of tracks, and wherein the portion of the video transcoded by the transcoder begins at a previous key frame of the plurality of key frames that is immediately previous to the timestamp associated with the partial transcoded file.

9. The computer-implemented method of claim 7, wherein the plurality of tracks further include a metadata track.

10. The computer-implemented method of claim 7, further comprising:

determining that the timestamp associated with the partial transcoded file does not correspond to the plurality of key frames of one or more of the plurality of tracks, and generating the output video includes, for each key frame of the plurality of key frames:

buffering transcoded frames from one or more tracks of the plurality of tracks;

when the key frame is reached and is a synchronized key frame that is synchronized across the plurality of tracks, writing a chunk of the output video to storage, the chunk provided between a previous key frame and the key frame; and discarding one or more additional frames that have been generated by the transcoding after the synchronized key frame.

11. The computer-implemented method of claim 1, wherein the timestamp includes a plurality of time values, each time value corresponding to a respective track of the plurality of tracks, and wherein transcoding the portion of the video comprises:

decoding each of the plurality of tracks beginning at the respective time value of the plurality of time values to obtain corresponding raw data; and encoding the raw data for the decoded plurality of tracks to obtain a corresponding output track.

12. A computing device comprising:

a processor; and a memory coupled to the processor, with instructions stored thereon that, when executed by the processor, cause the processor to perform operations comprising:

obtaining a video, wherein the video includes a plurality of tracks;

determining that a partial transcoded file is available that corresponds to the video based on determining that current configuration settings of the transcoder for the video match configuration settings associated with the partial transcoded file;

in response to determining that the partial transcoded file is available:

obtaining a timestamp associated with the partial transcoded file;

transcoding a portion of the video with a transcoder, wherein the portion of the video begins relative to the timestamp associated with the partial transcoded file combining the partial transcoded file and the transcoded portion of the video to generate an output video.

13. The computing device of claim 12, wherein the memory has further instructions stored thereon that cause the processor to perform further operations comprising:

transcoding the video by the transcoder from a start of the video;

receiving a first interrupt during transcoding of the video by the transcoder;

in response to the first interrupt, saving output of the transcoder as the partial transcoded file and storing the timestamp associated with the partial transcoded file, the timestamp corresponding to a time of the first interrupt;

receiving a second interrupt during the transcoding of the portion of the video by the transcoder;

in response to the second interrupt, saving second output of the transcoder by adding the second output of the transcoder to the partial transcoded file and storing a second timestamp corresponding to a time of the second interrupt;

obtaining the second timestamp associated with the partial transcoded file;

transcoding a second portion of the video with the transcoder, wherein the second portion of the video begins relative to the second timestamp associated with the partial transcoded file; and wherein combining the partial transcoded file and the transcoded portion of the video includes combining the partial transcoded file and the second portion of the video.

14. The computing device of claim 13, wherein the output of the transcoder includes a plurality of partial output tracks, each partial output track corresponding to a particular track of the plurality of tracks of the video, and wherein the operations further comprise, in response to the first interrupt, saving configuration settings associated with the partial transcoded file, wherein the configuration settings include one or more of:
 a format of each of the plurality of partial output tracks, or
 one or more of: a bitrate parameter, a width parameter, or a height parameter.

15. The computing device of claim 12, wherein the plurality of tracks include at least one audio track and at least one video track, wherein the at least one video track includes a plurality of key frames and a plurality of non-key frames, each key frame and each non-key frame associated with a corresponding timestamp, wherein the memory has further instructions stored thereon that cause the processor to perform further operations comprising:
 determining that the timestamp associated with the partial transcoded file does not correspond to the plurality of key frames of one or more of the plurality of tracks, and
 wherein the portion of the video transcoded by the transcoder begins at a previous key frame of the plurality of key frames that is immediately previous to the timestamp associated with the partial transcoded file.

16. The computing device of claim 12, wherein the memory has further instructions stored thereon that cause the processor to perform further operations comprising:
 receiving an interrupt during transcoding of the portion of the video by the transcoder; and
 in response to the interrupt, updating the partial transcoded file to include partial output of the transcoder.

17. The computing device of claim 12, wherein the plurality of tracks include at least one audio track and at least one video track, wherein the at least one video track includes a plurality of key frames and a plurality of non-key frames, each key frame and each non-key frame associated with a corresponding timestamp, wherein the memory has further instructions stored thereon that cause the processor to perform further operations comprising:
 determining that the timestamp associated with the partial transcoded file does not correspond to the plurality of key frames of one or more of the plurality of tracks, and
 generating the output video includes, for each key frame of the plurality of key frames:
  buffering transcoded frames from one or more tracks of the plurality of tracks;
  when the key frame is reached and is a synchronized key frame that is synchronized across the plurality of tracks, writing a chunk of the output video to storage, the chunk provided between a previous key frame and the key frame; and
  discarding one or more additional frames that have been generated by the transcoding after the synchronized key frame.

18. A non-transitory computer-readable medium with instructions stored thereon that, when executed by a processor, cause the processor to perform operations comprising:
 obtaining a video, wherein the video includes a plurality of tracks;
 determining that a partial transcoded file is available that corresponds to the video based on determining that current configuration settings of the transcoder match configuration settings associated with the partial transcoded file;
 in response to determining that the partial transcoded file is available:
  obtaining a timestamp associated with the partial transcoded file;
  transcoding a portion of the video with a transcoder, wherein the portion of the video begins relative to the timestamp associated with the partial transcoded file; and
  combining the partial transcoded file and the transcoded portion of the video to generate an output video.

19. The non-transitory computer-readable medium of claim 18, with further instructions stored thereon that cause the processor to perform further operations comprising:
 transcoding the video by the transcoder from a start of the video;
 receiving a first interrupt during transcoding of the video by the transcoder; and
 in response to the first interrupt, saving first output of the transcoder as the partial transcoded file and storing the timestamp associated with the partial transcoded file, the timestamp corresponding to a time of the first interrupt;
 receiving a second interrupt during the transcoding of the portion of the video by the transcoder;
 in response to the second interrupt, saving second output of the transcoder by adding the second output of the transcoder to the partial transcoded file and storing a second timestamp corresponding to a time of the second interrupt;
 obtaining the second timestamp associated with the partial transcoded file;
 transcoding a second portion of the video with the transcoder, wherein the second portion of the video begins relative to the second timestamp associated with the partial transcoded file; and
 wherein combining the partial transcoded file and the transcoded portion of the video includes combining the partial transcoded file and the second portion of the video.

20. The non-transitory computer-readable medium of claim 18, wherein the plurality of tracks include at least one audio track and at least one video track, wherein the at least one video track includes a plurality of key frames and a plurality of non-key frames, each key frame and each non-key frame associated with a corresponding timestamp, and the computer-readable medium with further instructions stored thereon that cause the processor to perform further operations comprising:
 determining that the timestamp associated with the partial transcoded file does not correspond to the plurality of key frames of one or more of the plurality of tracks, and
 generating the output video includes, for each key frame of the plurality of key frames:
  buffering transcoded frames from one or more tracks of the plurality of tracks;
  when the key frame is reached and is a synchronized key frame that is synchronized across the plurality of tracks, writing a chunk of the output video to storage, the chunk provided between a previous key frame and the key frame; and discarding one or more additional frames that have been generated by the transcoding after the synchronized key frame.

\* \* \* \* \*